Jan. 23, 1962    J. BECHARD    3,018,117
ADJUSTABLE BRIDLE AND CLEVIS
Filed June 29, 1960    3 Sheets-Sheet 1
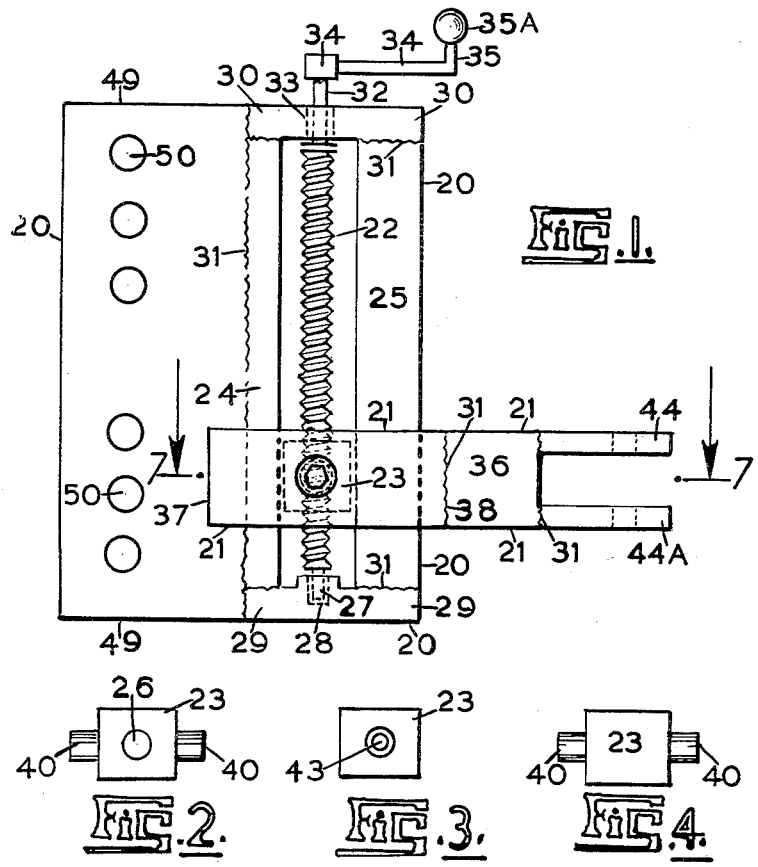
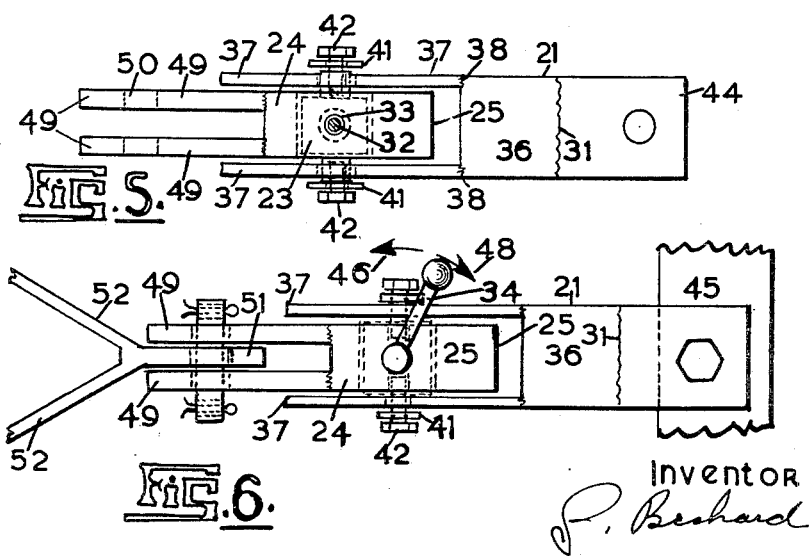
Inventor
J. Bechard

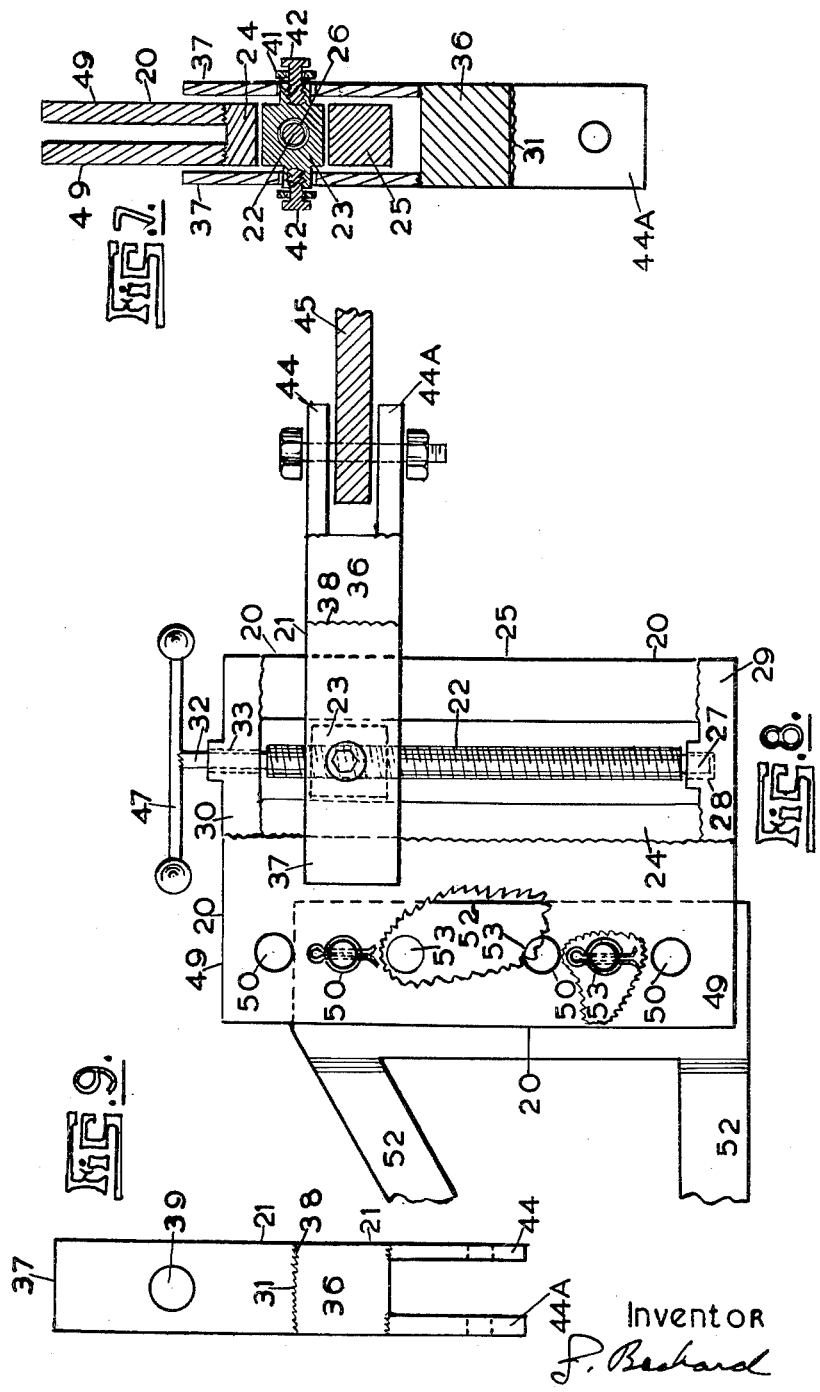

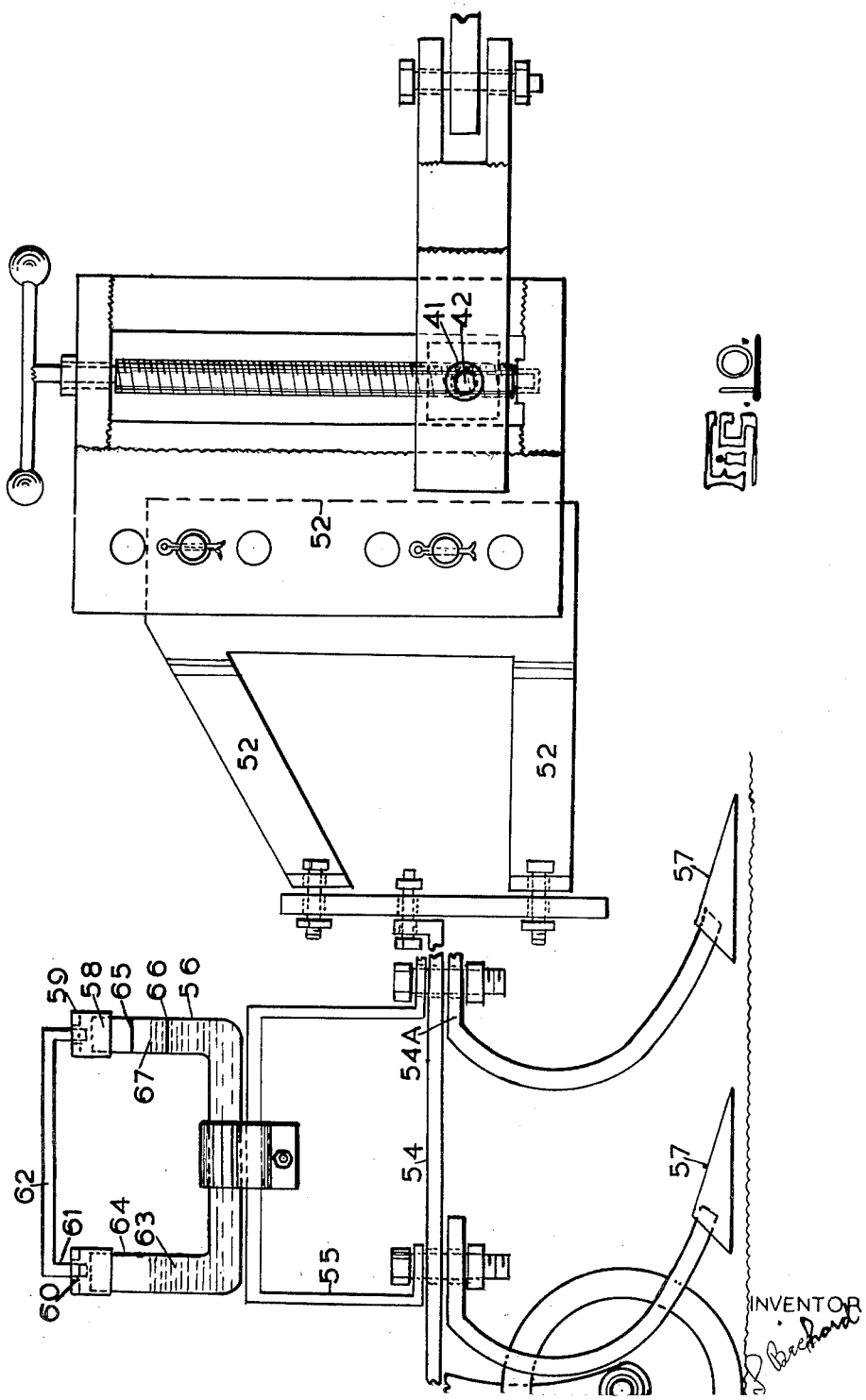

United States Patent Office 3,018,117
Patented Jan. 23, 1962

3,018,117
ADJUSTABLE BRIDLE AND CLEVIS
Jerome Bechard, Lajord, Saskatchewan, Canada
Filed June 29, 1960, Ser. No. 39,697
4 Claims. (Cl. 280—490)

This invention comprises a mechanical mechanism manually operable for raising and lowering the linkage between a tractor and cultivator in order that the linkage between a tractor or other power drawing machine and a cultivator or other machines drawn or pulled by traction power may be manually and readily adjusted in such a manner that the draw-bar of a tractor will be in horizontal line with the linkage connecting said bar to a cultivator or the like while said machines are in operation, and a level positioned on a frame member erected on the frame of a cultivator is provided to assist the operator of the tractor and cultivator to adjust the tractor draw-bar clevis upwardly and downwardly until the tractor draw-bar is pulling on the clevis in such a manner that the clevis and intermediate linkage between said clevis and cultivator are in horizontal alignment while the tractor and cultivator are in operation in order to maintain the front and rear cultivator earth moving tools on the same level while the cultivator is in operation.

One object has been to provide means to retain a tractor and cultivator in level drawing position when in operation.

A further object of my invention is to provide a manually operated block and screw for raising and lowering a tractor draw-bar clevis in order that the tractor or power machine may be adjusted to pull a cultivator or the like without pulling too much downward or upward on said drawn machine while in operation.

A further object is to provide a level to be positioned on the frame of a cultivator in order that the operator of the cultivator may ascertain whether or not the cultivator frame is remaining level while in operation.

With the above more important objects in view and such other minor objects as may appear as the specification proceeds, my invention consists essentially in the arrangement and construction of parts all as hereinafter more particularly described, reference being had to the accompanying drawings, in which:

FIGURE 1 is a side view in elevation of my adjustable bridle and clevis illustrating the clevis adjusting block and screw between vertical frame members, and wherein the draw-bar clevis has been lowered on the bridle.

FIGURE 2 is a horizontal top plan view in elevation of the clevis actuating block illustrating the trunnion pins or lugs projecting from the sides of the clevis actuating block, also the threaded aperture in the center of the said block for receiving the adjusting vertical screw.

FIGURE 3 is a side view in elevation of the clevis actuating block illustrating an end view of one of the trunnion pins or lugs and a threaded aperture centrally positioned in the end of said pin or lug.

FIGURE 4 is a horizontal view of one of the plain sides of the clevis actuating block in elevation illustrating the trunnion pins or lugs projecting from the sides of the said block.

FIGURE 5 is a horizontal top plan view in elevation of the adjustable bridle and clevis and, the upper screw spindle has been sectioned to dispose of the screw crank as seen in FIGURE 1 to allow an unobstructed view.

FIGURE 6 is a horizontal view in elevation of the adjustable bridle and clevis being connected to cultivator drag-bars and tractor draw-bar.

FIGURE 7 is a sectional view in elevation taken on the line 7—7 of FIGURE 1.

FIGURE 8 is a view in elevation of my adjustable bridle and clevis attached to the drag-bars of a cultivator and draw-bar of a tractor illustrating the clevis in raised position.

FIGURE 9 is a horizontal side view in elevation of the tractor clevis illustrating the aperture in the clevis straps in which the clevis actuating block trunnions or lugs are positioned when the clevis actuating block and clevis are in assembly.

FIGURE 10 is a horizontal view in elevation of the adjustable bridle and clevis attached to a cultivator, also illustrating the cultivator level positioned on a frame member secured to one of the frame members of the cultivator.

Like reference numerals refer to like parts throughout the specification and drawings.

Referring to the drawings, an adjustable bridle and clevis in combination with a level 56 on a cultivator according to my invention comprises a bridle construction 20 and a clevis 21 seen in complete assembly in FIGURE 1 and a level 56 seen in FIGURE 10. The object of this my invention is to provide a manually operable clevis adjusting screw 22 which is threaded through a block or large nut 23 of cubic formation, and the block or nut 23 is slidably mounted between vertical members 24 and 25, the block or nut 23 has a threaded aperture 26 through its central portion seen in FIGURES 2 and 7 to receive the adjusting screw 22, the adjusting screw 22 has a spindle 27 at its lower end which is mounted in an aperture 28 in the center of the lower plate 29 and the vertical members 24 and 25 are welded at their lower ends to the ends of the lower plate 29 and at their upper ends to the ends of the top plate 30 as indicated by wavy lines 31 and, the screw 22 has a longer spindle 32 at its upper end which goes through an aperture 33 through the plate 30 and into a crank handle 34 which has an upward turned end 35 and ball 35A for hand control. The clevis 21 is constructed of a solid block 36 of suitable metal to which two substantial straps 37 are welded at 38, more readily seen in FIGURES 5 and 9 and, there is an aperture 39 in each strap 37 wherein the trunnion pins or lugs 40 of the block or nut 23 are positioned through the straps 37 and, the straps 37 are held against the ends of the trunnion pins or lugs by washers 41, and flat headed set screws 42 go through washers 41 and are threaded into the threaded apertures 43 of the trunnion pins or lugs 40 readily seen in FIGURE 7. At the front of the clevis block 36 are welded two jaws, a top jaw 44 and a bottom jaw 44A these jaws are spaced apart sufficiently to span any tractor draw-bar. In the view FIGURE 1 the cultivator is set at a shallow depth and has raised the clevis 36 above the level or height of the tractor draw-bar 45, therefore, the clevis was let down by turning the screw crank 34 anti clockwise in the direction of the arrow 46 as seen in FIGURE 6 in order that the tractor would have a straight pull on the cultivator, FIGURE 8 illustrates that the cultivator has been adjusted for deep cultivation necessitating the raising of the clevis 21 by turning the crank 34 as illustrated in FIGURES 1 and 6 of the ball ended handle 47 in the direction of the arrow 48 seen in FIGURE 6 in order that the tractor will have a straight pull on the cultivator. Wavy lines indicate parts welded together and are designated by the numeral 31. The bridle 20 is constructed by welding the following parts together as seen in FIGURES 1, 5 and 8, the front portion of the bridle 20 is composed of a vertical bar 25 preferably of square cross section having its lower end welded to a plate 29 and its upper end welded to a plate 30 and, spaced rearwardly from the bar 25 is a vertical bar 24 preferably of rectangular cross section having its lower end welded to the plate 29 and its upper end welded to the plate 30, and the bars 24 and 25 are of the same length and, spaced apart to allow the cubic screw block 23 a sliding fit between said bars from one end thereof to the other, and centrally positioned between the bars 24 and 25 and in the plates 29 and 30 are apertures 28 and 33 to accommodate the spindles 27 and 32 of the screw 22, and there are a pair of wing members 49 welded in spaced apart position to the rear side of the vertical bar 24 and the wing members 49 have a plurality of apertures 50 seen in FIGURES 1, 8 and 10, the wing members 49 are spaced apart to allow the front end 51 of the cultivator drag-bars 52 seen in FIGURE 6 to be positioned between the wing members 49, and the end 51 of the drag-bars 52 has apertures 53 seen in FIGURE 8 to match the apertures 50 in the bridle wing members 49. The back end of the clevis 21 has been designated by the numeral 36 and the cross section view taken on the line 7—7 of FIGURE 1 illustrates the general construction of the bridle 20 in combination with the clevis 21 and the screw block 23 and screw 22. In FIGURE 10 is seen the adjustable bridle 20, and adjustable clevis assembly 21 attached to a cultivator 54A and on the cultivator frame 54 is a stand 55, and on the stand 55 is secured a level 56 in level position with the cultivator earth moving tools 57, the level 56 is of U configuration and the ends 58 have fluid tight caps 59 having apertures 60 through their crowns to receive the downward projecting ends 61 of a pipe 62, and the pipe 62 is for the purpose of containing air therein to allow the fluid 63 to oscillate within the pipe body 64. By actual experience in the use of the invention I have found that it is necessary to use the level 56 in combination with my bridle 20 and adjustable clevis 21 in order to ascertain how to set the clevis 21 in proper position for level operation of the cultivator. There are two marks 65 and 66 on the front of the level 56 and the top surface 67 of the fluid 63 is centrally between the marks 65 and 66 when the cultivator earth moving tools 57 are in the same position on the same horizontal line, and when the top surface of the fluid 67 is at line 66 the front earth moving tool or tools 57 of the cultivator will be too high, and when the fluid 63 is at the line 65 on the front of the level 56 the front earth moving tool or tools 57 will be too low while in operation, when the front of the cultivator is held too high by the tractor draw-bar 45 the screw 22 is turned to raise the block 22 which in turn raises the clevis 21 until the tractor draw-bar 45 is pulling the cultivator back and front earth moving tools 57 in line with each other and on the same horizontal line. The adjustable clevis assembly 21 is pivotally mounted on the trunnion pins or lugs 40 of the screw block or nut 23 to allow vacillation between the tractor and cultivator when the tractor and cultivator are suddenly forced out of alignment while travelling over any rough surface. While I have described and illustrated my adjustable clevis being manually operated by means of a block and screw, I do not wish to be confined to the manual use of the block and screw only, as the cubic block or nut could be operated by electric or hydraulic power means enabling the operator of the cultivator and tractor to adjust the clevis 21 while the cultivator and tractor are in motion and, adjustment of the cultivator could be made form the tractor by the operator.

It will be understood, of course, that modifications may be made in the preferred embodiment of the invention described and illustrated herein without departing from the spirit and scope of the invention as defined by the appended claims.

Having thus described my invention, what I claim and desire to protect by Letters Patent of the United States is:

1. An adjustable linkage for power drawn implements of the type including a draw bar and a drag bar, a clevis including a solid central body portion, jaws extending from one end of said clevis body for union with the draw bar, two parallel straps integral with the clevis body and extending from the end of said body remote from said jaws, said straps having a pair of aligned apertures therein, a block having a threaded hole therein and trunnion pins extending from opposite sides thereof, said block being supported by said trunnion pins in the apertures of the straps and pivotally supported therewith, a bridle member having a pair of wing members extending therefrom for union with the drag bar of an implement, vertical support bars extending from the end of the bridle member opposite said wing members, said bridle member including spaced horizontal plates for supporting said vertical bars, an upright screw having a spindle extending from its top and bottom, said spindle being rotatably mounted in said horizontal plates, said block having a threaded vertical bore, said screw being threadably mounted in said bore, said screw and support bars being disposed between said clevis straps, and handle means projecting from the top spindle on said vertical screw whereby rotation of said handle will cause the raising or lowering of said block in relation to said screw and bridle and hence the lowering or raising of the drag bar in relation to the draw bar.

2. An adjustable linkage for connection between power drawn vehicles having a draw bar and implements having a drag bar, the combination of a clevis having a central body portion with jaws extending from one end of the body and straps extending from the other end of the body, said jaws being adapted for mounting to the draw bar, a bridle member having wing members at one end for connection with a drag bar and spaced vertical bars at the other end, said vertical bars being disposed between said clevis straps, said bridle member having horizontal supporting means above and beneath said vertical bars, an upright screw rotatably mounted in said supporting means of the bridle and disposed between said vertical bars and said clevis straps, and a block rotatably mounted to and between said clevis straps and threadably mounted to said vertical screw whereby the rotation of said screw will cause the block to threadably travel upward and downward on said screw and raise and lower said clevis straps to thereby raise and lower said drag bar with respect to said draw bar.

3. An adjustable linkage device for connection between power driven vehicles having a draw bar and implements having a drag bar, the combination of a clevis having a central body portion with jaws extending from one end of said body portion and straps extending from the other end of the body, said jaws being adapted for mounting to a drag bar, a bridle member having wing portions at one end and vertical spaced bars at the other end, said bars being receivable between said clevis straps, and an upright screw mounted between said bar and rotatably connected to said bridle member, a block threadably mounted to said screw, pins mounted to said block and extending radially and outward in opposed relation, said straps pivotally mounting said block pins, and a handle at the upper end of said screw for rotating said screw whereby the rotation of the screw will cause the block to threadably travel upward and downward on said screw and raise and lower said clevis straps to thereby raise and lower the drag bar with respect to the draw bar.

4. A linkage adjustment device according to claim 3, wherein said device includes level indication means adjacent the implement, said level indication means including a U-shaped tube having vertical leg portions, fluid partially filling said tube, and markings along one of said vertical legs, said leveling device being fluid responsive to angular relation of the implement with respect to a horizontal plane whereby, when the screw is adjusted by being threadably moved either upward or downward, the leveling device will register the change.

References Cited in the file of this patent

UNITED STATES PATENTS

| | | |
|---|---|---|
| 1,162,946 | Olson | Dec. 7, 1915 |
| 1,354,288 | Eubanks et al. | Sept. 28, 1920 |
| 2,189,864 | McDaniel | Feb. 13, 1940 |
| 2,477,927 | Hanson | Aug. 2, 1949 |
| 2,534,971 | Henroid | Dec. 19, 1950 |
| 2,654,339 | Sperling | Oct. 6, 1953 |